Patented July 9, 1940

2,206,872

UNITED STATES PATENT OFFICE 2,206,872

PROCESS OF STABILIZING CARBOHYDRATE DERIVATIVES

Rudolph S. Bley, Milligan College, Tenn., assignor to North American Rayon Corporation, New York, N. Y., a corporation of Delaware No Drawing. Original application November 22, 1937, Serial No. 175,980. Divided and this application September 27, 1938, Serial No. 231,900

12 Claims. (Cl. 260—226)

This is a divisional application of my application Ser. No. 175,980, filed November 22, 1937, entitled, "Process of stabilizing carbohydrate derivatives".

The present invention relates to a process of stabilizing saturated carbohydrate derivatives, such as carbohydrate esters and ethers.

One object of this invention is to provide for a process of stabilizing a saturated carbohydrate derivative by treating a crude carbohydrate derivative with anhydrous, liquid ammonia.

Another object of my invention is to provide for a process of stabilizing a crude, saturated carbohydrate derivative by treating it with anhydrous, liquid ammonia at a temperature at which it is not decomposed by said ammonia.

A further object of this invention is to provide for a process of stabilizing a crude, saturated carbohydrate derivative by treating it with anhydrous, liquid ammonia at or below its boiling point.

A further object of my invention is to provide for a process of purifying and/or stabilizing a crude, saturated carbohydrate derivative by treating it with anhydrous, liquid ammonia in the presence of an auxiliary agent, said agent being inert to, i. e., incapable of chemically reacting with said ammonia.

Other objects of my invention will become apparent to those skilled in the art from a study of the following specification.

Saturated carbohydrate esters and ethers are carbohydrate derivatives devoid of free hydroxyl groups, unsaturated ester groups and unsaturated ether groups. Saturated carbohydrate esters are conventionally produced by causing alkali metal carbohydrates to react with acid halides, such as acetyl halides, propionyl halides, etc., or by treating carbohydrates with organic anhydrides in the presence of acid catalysts. Saturated carbohydrate ethers may be prepared by causing alkali metal carbohydrates to react upon organic halides in the presence of acid catalysts. Acid catalysts used in the esterification and etherification of carbohydrates, such as cellulose, starches, sugars, pectins, etc., are, for examples, sulphuric acid, nitric acid, hydrochloric acid, thionyl chloride, phosphorus pentoxide, phosphorus oxychloride, selenic acid, pyridinium acid sulphate, sulphur dioxide, phosgene, zinc chloride, perchloric acid, sulpho-acetic acid, sulphinic acids, halogenated fatty acids, lower molecular fatty acids, halogenated fatty acid anhydrides, naphthalene sulphonic acids, p-toluene sulpho-chloride, etc. The esterification and etherification of carbohydrates may also be carried out in the presence of organic compounds incapable of dissolving fully esterified or etherified cellulose in order to obtain the respective carbohydrate derivative in fibrous and/or granular form. Furthermore, the esterification or etherification of a carbohydrate may be carried out in such a manner that mixed carbohydrate esters or ethers are obtained. Saturated mixed carbohydrate esters are carbohydrate derivatives having at least two different ester groups while being devoid of free hydroxyl groups. Similarly, saturated mixed carbohydrate ethers are carbohydrate derivatives having at least two different ether groups while being devoid of free hydroxyl groups. In addition, carbohydrate ester-ether derivatives may be prepared by substituting hydrogen atoms of the free hydroxyl groups of a carbohydrate with ester and ether groups. Such carbohydrate derivatives which are immune to attack by anhydrous, liquid ammonia may be treated in accordance with my present invention.

However, although these reactions run smoothly in the presence of acid catalysts, the saturated esters and ethers obtained contain impurities, such as lower substituted esters and ethers, side reaction products and catalyst residues, these residues causing discolorations in artificial products formed from such esters and ethers.

Innumerable attempts have been made to stabilize cellulose triacetate in solid form by removing the acidic catalysts contained therein since it has the valuable property of being more hydrophobic than cellulose diacetate. U. S. Patent 1,954,729 to Dreyfus of April 10, 1934, discloses the stabilization of cellulose derivatives by treating them with an aliphatic alcoholic amine in the presence of sodium hypochlorite, etc. U. S. Patent 2,019,921 to Malm et al. of November 5, 1935 relates to a process of stabilizing cellulose triacetate by treating it with a petroleum distillate having a boiling range of about 150–200° C. Sindl (vide U. S. Patent 2,066,584 of January 5, 1937) stabilizes cellulose triacetate containing sulphuric acid residues in a swelled state with a mixture of a lower fatty acid and a liquid ester of a lower fatty acid. U. S. Patent 2,071,333 to Dreyfus of February 23, 1937, removes the acid catalysts by treating crude cellulose triacetate with steam. Alkali fluorides and borates are used for the same purpose by Ellis et al. as disclosed in their U. S. Patent 2,072,253 of March 2, 1937. U. S. Patent 2,072,260 to Haney of March 2, 1937, discloses the elimination of acid catalysts from crude cellulose triacetate by means of water-insoluble salts of basic character. Martin (vide U. S. Patent 2,072,270 of March 2, 1937) neutralizes the acid residues with sodium acetate, etc. U. S. Patent 2,095,334 to Jones of October 12, 1937, relates to a process of stabilizing cellulose triacetate by passing through it a hot 0.01 to 0.03% sulphuric acid solution. Malm and Fordyce (vide U. S. Patent 2,095,822 of October 12, 1937) remove the acid catalyst of cellulose triacetate with butyric acid, etc.

Furthermore, I am well aware that cellulose has been rendered more reactive by treating it with liquid ammonia (vide U. S. Patent 1,173,336 to Bronner of February 29, 1916), and that U. S. Patents 1,966,756 to Gajewski and 2,012,382 to Fink, disclose the dissolution of fibroin in anhydrous, liquid ammonia. I am also well aware that cellulose diacetate has been dissolved in liquid, anhydrous ammonia to form solutions from which artificial products may be spun, as set forth, for example, in U. S. Patent 1,544,809 to Clancy of July 7, 1925, and that nitrogenous cellulose derivatives have been prepared by causing ammonia in anhydrous alcohol to react with cellulose esters having unsaturated radicals in accordance with a process disclosed in U. S. Patent 2,073,052 to Dreyfus of March 9, 1937.

I have unexpectedly found that crude, saturated carbohydrate derivatives, such as esters and ethers can be stabilized by treating them with anhydrous, liquid ammonia. During this treatment incompletely saturated carbohydrate derivatives are separated from the fully saturated ones and the acid catalysts, contained therein, are removed with the formation of innocuous ammonium salts which are either soluble or insoluble in anhydrous, liquid ammonia. Insoluble ammonium salts may be removed from the purified carbohydrate derivatives by washing, etc. Esters formed by chemical interaction between acid halides, anhydrides or halides and the acid catalysts are generally ammonolyzed in liquid, anhydrous ammonia. Although I prefer to use anhydrous, liquid ammonia at its boiling point, i. e., at about −33° C., my process may be carried out at a temperature below −33° C. by evacuating the container in which the crude carbohydrate derivative is treated with anhydrous liquid ammonia. In this manner, a complete stabilization and purification of a crude, saturated carbohydrate derivative may be achieved even at a temperature of about −50° C. Furthermore, it is also within the scope of the present invention to stabilize and purify a crude, saturated carbohydrate derivative by treating it in a closed container at which it is resistant to chemical attack by anhydrous liquid ammonia at a temperature about −33° C. Each saturated, carbohydrate derivative has a critical temperature at which it is immune to anhydrous, liquid ammonia, and this temperature must be predetermined by experiment.

The stabilization of a crude, saturated carbohydrate derivative, as set forth above, may also be carried out in the presence of an auxiliary agent or a plurality of auxiliary agents. Auxiliary agents, in accordance with my present invention, are compounds which are miscible with or capable of being dissolved by anhydrous, liquid ammonia without decomposition i. e., compounds which are inert to anhydrous, liquid ammonia. In addition, these auxiliary agents must be incapable of decomposing the saturated carbohydrate derivatives. They may, furthermore, be compounds capable of dissolving incompletely saturated carbohydrate derivatives, i. e., carbohydrate derivatives having one free hydroxyl group or a plurality of free hydroxyl groups. These auxiliary agents may be organic or inorganic compounds, such as benzene, ethers, alcohols, metal nitrates, ammonium salts, metal sulfites, etc. They allow a very prolonged treatment of saturated carbohydrate esters at temperatures above −33° C. with anhydrous, liquid ammonia, and they may be added to anhydrous, liquid ammonia, to assist in the removal of incompletely saturated carbohydrate esters and ethers.

In carrying out my stabilization process, I introduce a crude, saturated carbohydrate derivative either in a dissolved or fibrous form, into a Dewar flask or a similar container filled with anhydrous, liquid ammonia, and let it remain therein until the catalyst has been neutralized and other impurities, such as incompletely saturated carbohydrate derivatives, etc., have been dissolved and/or dispersed in said ammonia or auxiliary agent. The following table depicts the results obtained by varying the duration of treatment.

Table

| Duration of treatment, hours | Residual catalyst in saturated carbohydrate derivative before treatment, percent by weight | Catalyst content of saturated carbohydrate derivative after treatment, percent by weight |
|---|---|---|
| 1 | 1.5 | 0.068 |
| 2 | 1.5 | 0.036 |
| 3 | 1.78 | 0.024 |
| 4 | 1.78 | 0.017 |
| 5 | 1.78 | 0.012 |
| 15 | 1.78 | Cannot be determined with standard methods. |

*Example I*

5 grams of anhydrous wheat starch are dispersed in a mixture of 25 ml. of stearic acid chloride, 3 ml. pyridine and anhydrous sodium sulphate as desiccator. This mixture is refluxed for several hours at a temperature of about 100° C. The starch stearate is separated and introduced into anhydrous, liquid ammonia for several hours. It is then practically free from acid residues. The starch stearate is soluble in ether, ethyl acetate, chlorinated, aliphatic hydrocarbons and aromatic hydrocarbons. Other carbohydrate esters and as well as ethers may be treated as set forth above.

*Example II*

About 10 grams of anhydrous cane sugar are introduced at about 50° C. into liquid, anhydrous ammonia containing dispersed sodium metal. The sodium derivative of cane sugar is separated from the ammonia and excess sodium, suspended in benzene and treated with acetyl bromide in the presence of a small amount of an acid catalyst. The saturated acetyl derivative of cane sugar is subsequently introduced into anhydrous, liquid ammonia until it is free from acidic residues. The sodium derivative of cane sugar may be reacted with other acid halides or with halides to form esters or ethers, respectively, of sugar which may be stabilized in anhydrous, liquid ammonia. Other sugar esters and ethers may be stabilized in the same manner.

*Example III*

About 50 grams of cellulose linters are completely acetylated with 1475 ml. of acetic anhydride in the presence of 40 grams of concentrated sulphuric acid and 2640 ml. of ethyl acetate. The fibrous cellulose triacetate, after a preliminary wash, contains about 1.78% of sulphuric acid by weight. About 8 grams of this crude triacetate are introduced into about 300 ml. of anhydrous, liquid ammonia at a temperature of about $-33°$ C. for about 4 hours. The fibrous triacetate is separated by decantation from the ammonia containing dissolved cellulose diacetate, ammonium sulphate and other impurities and subsequent evaporation of residual ammonia. The purified, stabilized triacetate contains about 0.017% of sulphuric acid. It is completely soluble in chloroform, dioxane and other triacetate solvents. By prolonging this treatment, the sulphuric acid can be completely removed. The process can be carried out at higher or lower temperature. Auxiliary agents may be added to the anhydrous, liquid ammonia.

*Example IV*

About 28 grams of propionic acid, 70 grams of glacial acetic acid, 150 grams of acetic anhydride (85%), and 0.5 gram of sulphuric acid (spec. grav. 1.85) and 50 grams of a purified cotton are thoroughly mixed. The mixture is maintained for about 6 hours at a temperature of about 10 to 25° C. to form a clear dope. The product is precipitated and washed. It is chloroform-soluble and consists of fully esterified cellulose acetate propionate containing about 30% acetyl and 18% propionyl. It contains about 1.2% by weight of sulphuric acid. About 10 grams of this cellulose acetate propionate are introduced into about 300 ml. of anhydrous, liquid ammonia for about 5 hours. The sulphuric acid content is reduced to 0.013%. The sulphuric acid can be completely removed by prolonged treatment. A suitable auxiliary agent in this treatment is, for example, benzene. The temperature at which stabilization and purification is carried out may be varied.

*Example V*

About 27.7 grams of sodium stearate are mixed with about 10.2 grams of chloracetyl chloride to form an intimate mixture which is heated under reflux at a temperature of about 100° C. for about 6 hours. The mass is filtered while hot with about 200 ml. of ethylene chloride. The filtered ethylene chloride is re-added to the mass to which about 0.2 cc. of a catalyst, consisting of 1 part by volume of sulphuric acid and 3 parts by volume, of phosphoric acid, is added. About 5 grams of a cellulose acetate having an acetyl value of about 35% are treated in this mixture for about two days at a temperature of about 55° C. The clear dope is diluted with ethylene chloride, filtered and precipitated in methyl alcohol. The resulting product, saturated cellulose acetate stearate, dissolves in benzene and chloroform. It contains about 2% of residual catalyst. After treating this cellulose acetate stearate for about 20 hours in anhydrous, liquid ammonia it is practically devoid of acid residues. Methyl alcohol, for example, may be used as auxiliary agent.

*Example VI*

Sodium cellulosate, prepared by reacting stoichiometric amounts of metallic sodium and cellulose in anhydrous, liquid ammonia, is refluxed in benzene containing a sufficient amount of ethyl chloride and a small amount of hydrochloric acid (0.2%). The triethyl cellulose is precipitated and introduced into anhydrous, liquid ammonia for a period of about 10 hours. The triethyl cellulose is practically free from residual acid. This process may be carried out in the presence of auxiliary agents, such as methyl alcohol, etc.

Although these examples will serve to illustrate my invention, I wish to emphasize that any saturated, carbohydrate derivative may be stabilized and/or purified in anhydrous, liquid ammonia, that this treatment may be carried out at lower and higher temperatures, that the duration of treatment may be varied within wide limits without decomposing the carbohydrate derivative, that other auxiliary agents may be used with equal success and that the crude, saturated carbohydrate derivatives may be prepared with any catalyst known in the art. Modifications will readily be recognized by those skilled in the art, and I desire to include all such modifications and variations coming within the scope of the appended claims. In these claims the term "crude, saturated carbohydrate derivative" embraces carbohydrate derivatives, such as esters, ethers and xanthates, devoid of free hydroxyl, unsaturated ester or unsaturated ether groups capable of reacting with anhydrous, liquid ammonia and which in addition to catalyst residues may also contain other impurities, such as lower substituted carbohydrate esters or ethers, esters or ethers formed by chemical interaction during the esterification or etherification of carbohydrates, etc., from crude saturated carbohydrate derivatives. Furthermore, the term "anhydrous, liquid ammonia" is intended to comprise the liquefied gas having the formula $NH_3$ which, however, may contain such amounts of water as are unavoidable in the liquefaction when operated on a commercial scale.

I claim:

1. The process of stabilizing a crude carbohydrate derivative which comprises introducing a saturated carbohydrate ether-ester into anhydrous, liquid ammonia and subsequently separating said ammonia from said ether-ester, said ether-ester being substantially insoluble in said ammonia.

2. The process of stabilizing a crude carbohydrate derivative which comprises introducing a saturated carbohydrate ether-ester into anhydrous, liquid ammonia at a temperature of about $-33°$ C. and subsequently separating said ammonia from said ether-ester, said ether-ester being substantially insoluble in said ammonia.

3. The process of stabilizing a crude carbohydrate derivative which comprises introducing a saturated carbohydrate ether-ester into anhydrous, liquid ammonia at a temperature below $-33°$ C. and subsequently separating said ammonia from said ether-ester, said ether-ester being substantially insoluble in said ammonia.

4. The process of stabilizing a crude carbohydrate derivative which comprises introducing a saturated carbohydrate ether-ester into anhydrous, liquid ammonia in the presence of an auxiliary agent and subsequently separating said ammonia from said ether-ester, said agent being inert to said ammonia and said ether-ester being substantially insoluble in said ammonia.

5. The process of stabilizing a crude carbohydrate derivative which comprises introducing a saturated carbohydrate ether-ester into anhydrous, liquid ammonia at a temperature of about $-33°$ C. in the presence of an auxiliary agent and subsequently separating said ammonia from said ether-ester, said agent being inert to said ammonia and said ether-ester being substantially insoluble in said ammonia.

6. The process of stabilizing a crude carbohydrate derivative which comprises introducing a saturated, mixed carbohydrate ether-ester into anhydrous, liquid ammonia at a temperature below $-33°$ C. in the presence of an auxiliary agent and subsequently separating said ammonia from said ether, said agent being inert to said ammonia and said ether-ester being substantially insoluble in said ammonia.

7. A stabilized, saturated carbohydrate ether-ester prepared in accordance with the process set forth in claim 1.

8. A stabilized, saturated carbohydrate ether-ester prepared in accordance with the process set forth in claim 2.

9. A stabilized, saturated carbohydrate ether-ester prepared in accordance with the process set forth in claim 3.

10. A stabilized, saturated carbohydrate ether-ester prepared in accordance with the process set forth in claim 4.

11. A stabilized, saturated carbohydrate ether-ester prepared in accordance with the process set forth in claim 5.

12. A stabilized, saturated carbohydrate ether-ester prepared in accordance with the process set forth in claim 6.

RUDOLPH S. BLEY.